US012630056B2

(12) United States Patent
Ling et al.

(10) Patent No.: US 12,630,056 B2
(45) Date of Patent: May 19, 2026

(54) BATTERY SELF-HEATING CONTROL METHOD AND SYSTEM, AND ELECTRIC VEHICLE

(71) Applicant: BYD COMPANY LIMITED, Guangdong (CN)

(72) Inventors: Heping Ling, Shenzhen (CN); Lei Yan, Shenzhen (CN); Wen Gao, Shenzhen (CN); Jinyue Xie, Shenzhen (CN); Ke Zhu, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 0 days.

(21) Appl. No.: 18/920,519

(22) Filed: Oct. 18, 2024

(65) Prior Publication Data

US 2025/0042307 A1 Feb. 6, 2025

Related U.S. Application Data

(63) Continuation of application No. PCT/CN2023/084535, filed on Mar. 28, 2023.

(30) Foreign Application Priority Data

Apr. 29, 2022 (CN) .......................... 202210468352.4

(51) Int. Cl.
B60L 15/00 (2006.01)
B60L 58/18 (2019.01)
(Continued)

(52) U.S. Cl.
CPC ............. B60L 58/27 (2019.02); B60L 15/007 (2013.01); B60L 58/18 (2019.02);
(Continued)

(58) Field of Classification Search
CPC ........ B60L 58/27; B60L 15/007; B60L 58/18; B60L 1/02; B60L 2240/545; B60L 58/21; H01M 10/441; H01M 10/615; H01M 10/625; H01M 10/637; H01M 10/657; H01M 2220/20; H02P 27/06; H02P 29/62; H02J 2310/48; H02J 7/007194;
(Continued)

(56) References Cited

FOREIGN PATENT DOCUMENTS

| CN | 105762434 A | 7/2016 |
| CN | 105932363 A | 9/2016 |

(Continued)

OTHER PUBLICATIONS

CN105762434A (Year: 2016).*

(Continued)

*Primary Examiner* — Elim Ortiz
(74) *Attorney, Agent, or Firm* — Sheppard Mullin Richter & Hampton LLP

(57) ABSTRACT

A battery self-heating control method includes: in a first period of each of control periods, configuring a conduction state of an upper bridge arm assembly and a conduction state of a lower bridge arm assembly to be a self-heating state, and in the self-heating state, alternately charging and discharging a first battery pack and/or a second battery pack to heat the battery pack by a current on a second connecting wire between a motor and the battery pack.

20 Claims, 3 Drawing Sheets

(51) Int. Cl.

| | |
|---|---|
| *B60L 58/27* | (2019.01) |
| *H01M 10/44* | (2006.01) |
| *H01M 10/615* | (2014.01) |
| *H01M 10/625* | (2014.01) |
| *H01M 10/637* | (2014.01) |
| *H01M 10/657* | (2014.01) |
| *H02P 27/06* | (2006.01) |

(52) U.S. Cl.
CPC ....... *H01M 10/441* (2013.01); *H01M 10/615* (2015.04); *H01M 10/625* (2015.04); *H01M 10/637* (2015.04); *H01M 10/657* (2015.04); *H02P 27/06* (2013.01); *H01M 2220/20* (2013.01)

(58) Field of Classification Search
CPC .... H02J 7/0068; H02J 7/00; B60K 2001/008; B60K 1/00
USPC ....... 180/65.29, 65.21, 65.31; 320/150, 109; 307/10.1, 9.1, 10.7; 429/120
See application file for complete search history.

(56) References Cited

FOREIGN PATENT DOCUMENTS

| | | | | | |
|---|---|---|---|---|---|
| CN | 105762434 B | * | 12/2018 | .......... | H01M 10/615 |
| CN | 105932363 B | * | 3/2019 | .......... | H01M 10/633 |
| CN | 109823234 A | | 5/2019 | | |
| CN | 110116653 A | | 8/2019 | | |
| CN | 114566740 A | | 5/2022 | | |
| CN | 114889494 A | | 8/2022 | | |

OTHER PUBLICATIONS

CN105932363A (Year: 2016).*
International Search Report and Written Opinion for Application No. PCT/CN2023/084535, mailed on Apr. 30, 2023, 12 pages.
Shang, Yunlong et al., "An Automotive Onboard AC Heater Without External Power Supplies for Lithium-Ion Batteries at Low Temperatures", IEEE Transactions on Power Electronics, Nov. 2017, vol. 33, No. 9, pp. 7759-7769.

\* cited by examiner

In first preset time periods of at least some of control periods for driving and
controlling the motor, control a conduction state of the upper bridge arm assembly
and the lower bridge arm assembly to be a self-heating state, in the self-heating state,
an alternating current being provided on a connecting wire between a motor and a
battery pack, to alternately charge and discharge a first battery pack and/or a second
battery pack, to heat the battery pack

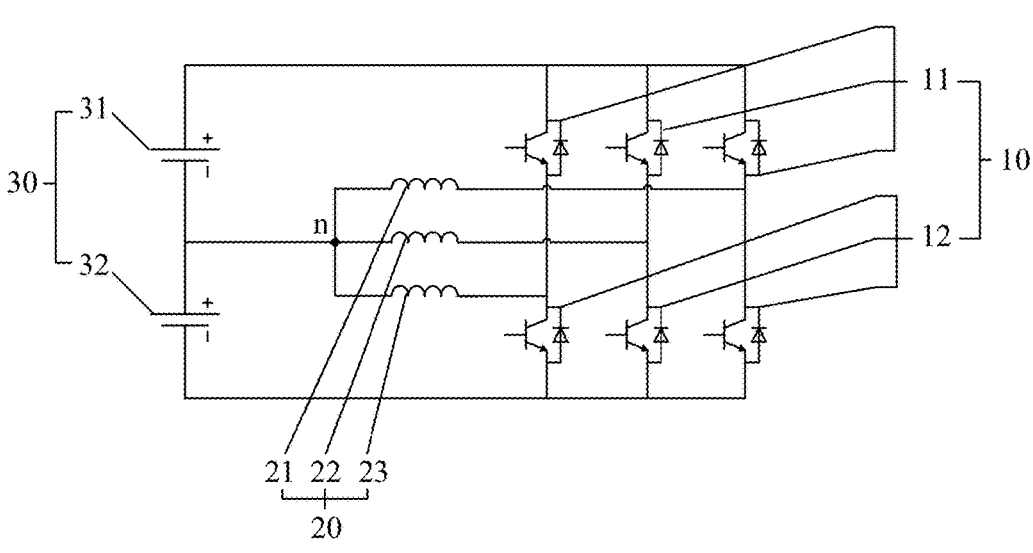

FIG. 2

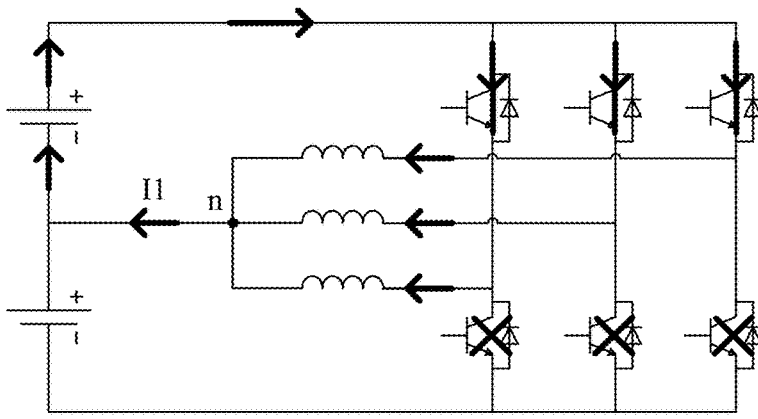

FIG. 3

BATTERY SELF-HEATING CONTROL METHOD AND SYSTEM, AND ELECTRIC VEHICLE

CROSS-REFERENCE TO RELATED APPLICATIONS

This application is a continuation application of International Patent Application No. PCT/CN2023/084535, filed on Mar. 28, 2023, which is based on and claims priority to and benefits of Chinese Patent Application No. 202210468352.4, filed on Apr. 29, 2022. The entire content of all of the above-referenced applications is incorporated herein by reference.

FIELD

The present disclosure relates to the field of motor control technologies, and in particular, to a battery self-heating control method and system and an electric vehicle.

BACKGROUND

Electric vehicles usually are equipped with heating devices to heat battery packs, so that the electric vehicles can still drive normally at low temperatures. The related art provides a battery self-heating solution, in which motor windings are used as energy storage elements to alternately charge and discharge batteries and the motor windings to achieve battery self-heating. However, in the above technology, the motor windings cannot output a drive current while outputting a self-heating current. Therefore, self-heating can only be performed when the motor does not drive the vehicle.

SUMMARY

The present disclosure is to resolve at least one of technical problems in the related art to some extent.

The first aspect of the present disclosure provides a battery self-heating control method.

The second aspect of the present disclosure provides a battery self-heating control system.

The third aspect of the present disclosure provides an electric vehicle.

An embodiment in a first aspect of the present disclosure provides a method for self-heating a battery pack, applied to a motor controller in an electric vehicle. The motor controller is electrically connected to a motor and the battery pack, and the motor is electrically connected to the battery pack. The motor controller includes a bridge arm inverter structure, and the bridge arm inverter structure includes an upper bridge arm assembly and a lower bridge arm assembly. The upper bridge arm assembly and the lower bridge arm assembly are connected to each other, the upper bridge arm assembly is connected to a positive electrode of the battery pack, and the lower bridge arm assembly is connected to a negative electrode of the battery pack.

The battery pack includes a first battery pack and a second battery pack connected to each other, a first connecting wire is led out between the first battery pack and the second battery pack, a first end of the motor is connected between the upper bridge arm assembly and the lower bridge arm assembly, and a second end of the motor is electrically connected to the battery pack through the first connecting wire.

The method includes:

in a first period of each of control periods, configuring a conduction state of the upper bridge arm assembly and a conduction state of the lower bridge arm assembly to be a self-heating state, and in the self-heating state, alternately charging and discharging the first battery pack and/or the second battery pack to heat the battery pack by a current on a second connecting wire between the motor and the battery pack.

According to an embodiment of the present disclosure, the motor includes an n-phase winding, a neutral point of the n-phase winding is electrically connected to the battery pack through the second connecting wire, and n is an integer greater than 1.

The upper bridge arm assembly includes n power switch devices, and the lower bridge arm assembly includes n power switch devices.

The self-heating state includes a first state, a second state, a third state, and a fourth state, where, in the first state, at least one power switch device of the n power switch devices of the upper bridge arm assembly is turned on, and power switch devices other than the at least one power switch device of the upper bridge arm assembly are turned off;

in the second state, the n power switch devices of the upper bridge arm assembly are turned off;

in the third state, at least one power switch device of the n power switch devices of the lower bridge arm assembly is turned on, and power switch devices other than the at least one power switch device of the lower bridge arm assembly are turned off; and in the fourth state, the n power switch devices of the lower bridge arm assembly are turned off.

The configuring a conduction state of the upper bridge arm assembly and a conduction state of the lower bridge arm assembly to be a self-heating state includes:

at a first frequency, switching the conduction state of the upper bridge arm assembly between the first state and the second state; and at a second frequency, switching the conduction state of the lower bridge arm assembly between the fourth state and the third state.

According to an embodiment of the present disclosure, in the first state, the n power switch devices of the upper bridge arm assembly are turned on; and in the third state, the n power switch devices of the lower bridge arm assembly are turned on.

According to an embodiment of the present disclosure, the configuring a conduction state of the upper bridge arm assembly and a conduction state of the lower bridge arm assembly to be a self-heating state includes:

at a third frequency, simultaneously turning the n power switch devices of the upper bridge arm assembly on or off, and at a fourth frequency, simultaneously turning the n power switch devices of the lower bridge arm assembly off or on, where the conduction state of the upper bridge arm assembly and the conduction state of the lower bridge arm assembly are different at a same moment.

According to an embodiment of the present disclosure, the control method further includes:

in a second period of each of the control periods, the upper bridge arm assembly and the lower bridge arm assembly are configured to be in a driving state, where in the driving state, the current on the second connecting wire between the motor and the battery pack is 0; and where the driving state and the self-heating state are different states.

According to an embodiment of the present disclosure, the first period occupies $$\frac{1}{n} + 1 \text{ to } \frac{1}{2}$$

of each of the control periods.

The embodiment in the first aspect of the present disclosure proposes a method for self-heating a battery pack, in which in first preset time periods of at least some of control periods for driving and controlling the motor, conduction states of the upper bridge arm assembly and the lower bridge arm assembly are controlled to be a self-heating state, and in the self-heating state, an alternating current is provided on a connecting wire between the motor and the battery pack (e.g., the second connecting wire), to alternately charge and discharge the first battery pack and/or the second battery pack, to heat the battery pack. That is, in the first preset time period, the conduction states of the upper bridge arm assembly and the lower bridge arm assembly are the self-heating state, and the alternating current is provided on the connecting wire between the motor and the battery pack, so that the alternating current can flow into the battery pack. The battery pack can produce a staggered oscillation effect due to the alternating current, so that the battery pack can generate heat, that is, the battery pack can self-heat. Through the above solution, the battery pack can also self-heat when the motor drives the vehicle.

An embodiment of a second aspect of the present disclosure proposes a system for self-heating a battery pack, including the battery pack, a motor, and a motor controller.

The motor controller is electrically connected to each of the motor and the battery pack, and the motor is electrically connected to the battery pack. The motor controller includes a bridge arm inverter structure, and the bridge arm inverter structure includes an upper bridge arm assembly and a lower bridge arm assembly. The upper bridge arm assembly and the lower bridge arm assembly are connected in series, the upper bridge arm assembly is connected to a positive electrode of the battery pack, and the lower bridge arm assembly is connected to a negative electrode of the battery pack.

The battery pack includes a first battery pack and a second battery pack connected in series, a connecting wire is led out between the first battery pack and the second battery pack (e.g., a first connecting wire), a first end of the motor is connected between the upper bridge arm assembly and the lower bridge arm assembly, and a second end of the motor is electrically connected to the battery pack through the first connecting wire.

The motor controller is configured to: in first in a first period of each of control periods, configuring a conduction state of the upper bridge arm assembly and a conduction state of the lower bridge arm assembly to be a self-heating state, and in the self-heating state, alternately charging and discharging the first battery pack and/or the second battery pack to heat the battery pack by a current on a second connecting wire between the motor and the battery pack.

According to an embodiment of the present disclosure, the motor includes an n-phase winding, and a neutral point of the n-phase winding is electrically connected to the battery pack through the second connecting wire, and n is an integer greater than 1.

The upper bridge arm assembly includes n power switch devices, and the lower bridge arm assembly includes n power switch devices.

The self-heating state includes a first state, a second state, a third state, and a fourth state, where, in the first state, at least one power switch device of the n power switch devices of the upper bridge arm assembly is turned on, and power switch devices other than the at least one power switch device of the upper bridge arm assembly are turned off;

in the second state, the n power switch devices of the upper bridge arm assembly are turned off;

in the third state, at least one power switch device of the n power switch devices of the lower bridge arm assembly is turned on, and power switch devices other than the at least one power switch device of the lower bridge arm assembly are turned off; and in the fourth state, the n power switch devices of the lower bridge arm assembly are turned off.

The motor controller, at a first frequency, switches the conduction state of the upper bridge arm assembly between the first state and the second state; and the motor controller, at a second frequency, switches the conduction state of the lower bridge arm assembly between the fourth state and the third state.

According to an embodiment of the present disclosure, in the first state, the n power switch devices of the upper bridge arm assembly are turned on; and in the third state, the n power switch devices of the lower bridge arm assembly are turned on.

According to an embodiment of the present disclosure, the motor controller, at a third frequency, simultaneously turns the n power switch devices of the upper bridge arm assembly on or off, and at a fourth frequency, simultaneously turns the n power switch devices of the lower bridge arm assembly off or on, where the conduction state of the upper bridge arm assembly and the conduction state of the lower bridge arm assembly are different at a same moment.

According to an embodiment of the present disclosure, the motor controller is further configured to: in a second period of each of the control periods, configure the upper bridge arm assembly and the lower bridge arm assembly to be in a driving state, where in the driving state, a current on the second connecting wire between the motor and the battery pack is 0; and where the driving state and the self-heating state are different states.

$$\frac{1}{n} + 1 \text{ to } \frac{1}{2}$$

According to an embodiment of the present disclosure, the period occupies of each of the control periods.

According to an embodiment of the present disclosure, the system further includes:

a switch apparatus disposed on the second connecting wire, and configured to turn on in the first period and turn off in the second period.

The embodiment in the second aspect of the present disclosure proposes a battery self-heating control system, in which in first preset time periods of at least some of control periods for driving and controlling the motor, a conduction state of the upper bridge arm assembly and the lower bridge arm assembly is controlled to be a self-heating state, and in the self-heating state, an alternating current is provided on a connecting wire between the motor and the battery pack (e.g., the second connecting wire), to alternately charge and discharge the first battery pack and/or the second battery pack, to heat the battery pack. That is, in the first preset time period, the conduction state of the upper bridge arm assembly and the lower bridge arm assembly is caused to be the self-heating state, and the alternating current is provided on the connecting wire between the motor and the battery pack, so that the alternating current can flow into the battery pack. The battery pack can produce a staggered oscillation effect due to the alternating current, so that the battery pack can generate heat, that is, the battery pack can self-heat. Through the above solution, the battery pack can also self-heat when the motor drives the vehicle.

An embodiment in a third aspect of the present disclosure provides an electric vehicle, including a battery self-heating control system according to the second aspect.

The additional aspects and advantages of the present disclosure will be provided in the following description, some of which will become apparent from the following description or may be learned from practices of the present disclosure.

BRIEF DESCRIPTION OF THE DRAWINGS

The foregoing and/or additional aspects and advantages of the present disclosure become apparent and comprehensible in the description made with reference to the following accompanying drawings, where:

FIG. 1 is a flowchart of a battery self-heating control method according to an embodiment of the present disclosure;

FIG. 2 is a circuit diagram in which a motor controller is connected to each of a battery pack and a motor according to an embodiment of the present disclosure;

FIG. 3 is a first schematic diagram of an upper bridge arm assembly and a lower bridge arm assembly in a driving state according to an embodiment of the present disclosure;

DETAILED DESCRIPTION

Figures 4, 5, 6:
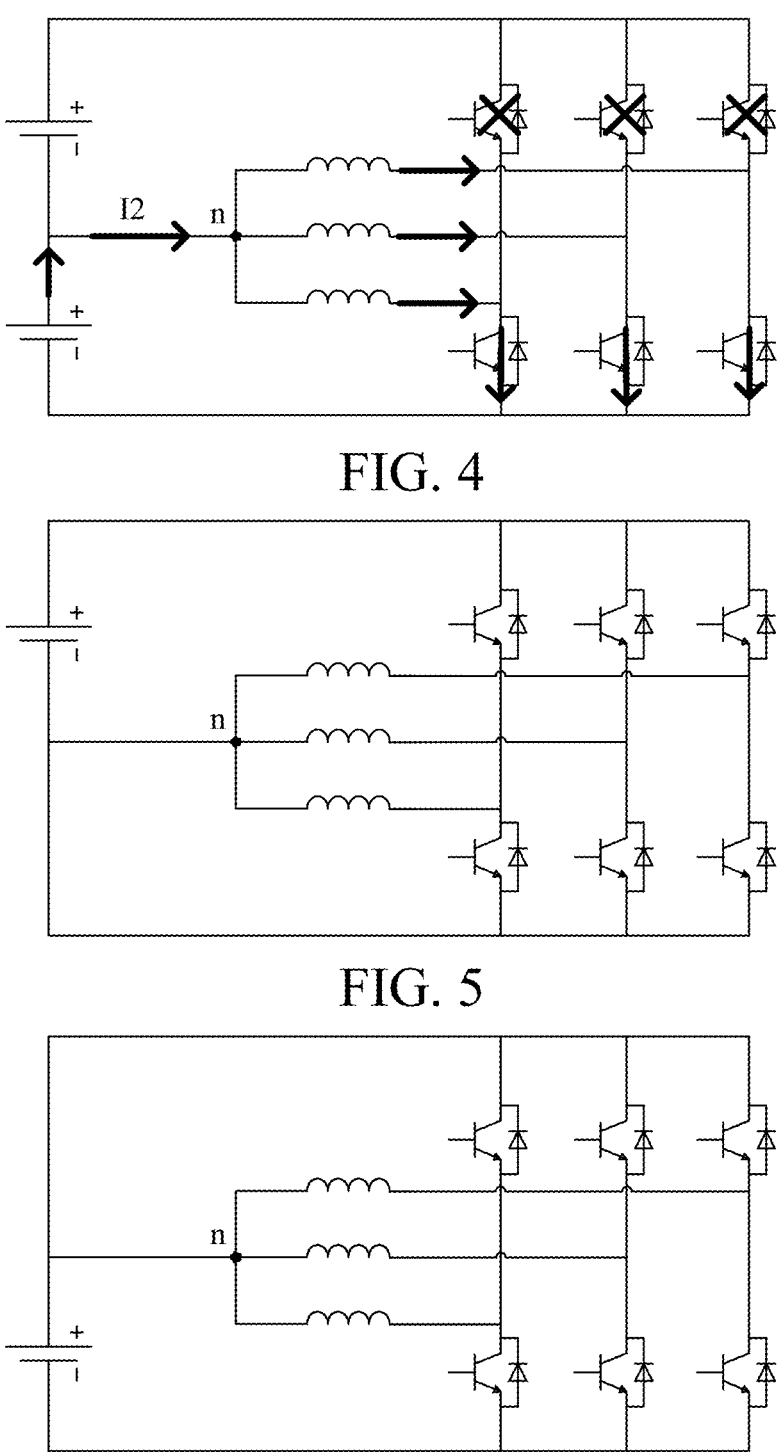
FIG. 4 is a second schematic diagram of an upper bridge arm assembly and a lower bridge arm assembly in a driving state according to an embodiment of the present disclosure.
FIG. 5 is a first equivalent circuit diagram of FIG. 1.
FIG. 6 is a second equivalent circuit diagram of FIG. 1.

The embodiments of the present disclosure are described below in detail. Examples of the embodiments are shown in the accompanying drawings, and same or similar reference signs in all the accompanying drawings indicate same or similar components or components having same or similar functions. The embodiments described below with reference to the accompanying drawings are examples, to explain the disclosure and shall not limit the disclosure.

A battery self-heating control method for self-heating a battery pack, and a system and an electric vehicle according to the embodiments of the present disclosure are described with reference to accompanying drawings.

FIG. 1 is a flowchart of a control method according to an embodiment of the present disclosure. FIG. 2 is a circuit diagram in which a motor controller is connected to each of a battery pack and a motor according to an embodiment of the present disclosure. The control method is applied to a controller of a motor 20 in an electric vehicle, the controller of the motor 20 is electrically connected to each of the motor 20 and a battery pack 30, and the motor 20 is electrically connected to the battery pack 30. The controller of the motor 20 includes a bridge arm inverter structure 10, the bridge arm inverter structure 10 includes an upper bridge arm assembly 11 and a lower bridge arm assembly 12, the upper bridge arm assembly 11 and the lower bridge arm assembly 12 are connected in series, the upper bridge arm assembly 11 is connected to a positive electrode of the battery pack 30, and the lower bridge arm assembly 12 is connected to a negative electrode of the battery pack 30. The battery pack 30 includes a first battery pack 31 and a second battery pack 32 connected in series, a connecting wire (e.g., a first connecting wire) is led out between the first battery pack 31 and the second battery pack 32, one end (e.g., a first end) of the motor 20 is connected between the upper bridge arm assembly 11 and the lower bridge arm assembly 12, and the other end (e.g., a second end) of the motor 20 is electrically connected to the center point of the battery pack 30 through the first connecting wire. As shown in FIG. 1, the control method includes:

Step 101: In first preset time periods of at least some of control periods for driving and controlling the motor, a conduction state of the upper bridge arm assembly or the lower bridge arm assembly is controlled or configured to be a self-heating state. In the self-heating state, an alternating current is provided on a connecting wire (e.g., a second connecting wire) between the motor and the battery pack, to alternately charge and discharge the first battery pack and/or the second battery pack, to heat the battery pack.

In the driving process of the electric vehicle, the motor controller controls the motor in real time, so that the motor can provide power to the electric vehicle so that the electric vehicle can continue to drive. When the motor controller controls the motor, the motor controller can control the motor according to multiple control periods, that is, can have multiple pulse-width modulation (Pulse-width modulation, PWM) periods. One PWM period can be considered as one control period.

Therefore, in the first preset time period of some or all of the multiple control periods, the conduction states of the upper bridge arm assembly and the lower bridge arm assembly can be controlled to be the self-heating state, that is, at the same moment, the state of the upper bridge arm assembly is different from that of the lower bridge arm assembly. That is, at a same moment, the states of the upper bridge arm assembly and the lower bridge arm assembly are controlled to be different, so that the conduction state of the upper bridge arm assembly and the lower bridge arm assembly is the self-heating state. Therefore, when the state of the upper bridge arm assembly is different from that of the lower bridge arm assembly at the same time, the second connecting wire between the motor and the battery generates an alternating current due to the state switching of the upper bridge arm assembly and the state switching of the lower bridge arm assembly. Then, the alternating current can flow into the battery pack, such that the battery pack has the alternating current. The first battery pack and/or the second battery pack alternately charge and discharge, and the battery pack can produce a staggered oscillation effect due to the alternating current, so that the battery pack can generate heat.

In addition, when driving and controlling the motor, the conduction state of the upper bridge arm assembly and the lower bridge arm assembly can be controlled to be the self-heating state in the first preset time period of each control period, or the conduction state of the upper bridge arm assembly and the lower bridge arm assembly can be controlled to be the self-heating state only in first preset time periods of some of the multiple control periods.

For example, when driving and controlling the motor, there are a total of 50 control periods. The conduction state of the upper bridge arm assembly and the lower bridge arm assembly can be controlled to be the self-heating state in the first preset time period of each control period, or the conduction state of the upper bridge arm assembly and the lower bridge arm assembly can be controlled to be the self-heating state in first preset time periods of 30 of the 50 control periods.

In addition, in some implementations, the motor may include an n-phase winding, and a neutral point of the n-phase winding is electrically connected to the battery pack through the second connecting wire. The upper bridge arm assembly includes n power switch devices, the lower bridge arm assembly includes n power switch devices, and n is an integer greater than 1. The self-heating state includes: a first state, in the first state, at least one power switch device of the upper bridge arm assembly being turned on, and the remaining power switch devices (e.g., the power switch devices other than the at least one power switch device) being turned off; a second state, in the second state, the n power switch devices of the upper bridge arm assembly being all turned off; a third state, in the third state, at least one power switch device of the lower bridge arm assembly being turned on, and the remaining power switch device (e.g., the power switch devices other than the at least one power switch device) being turned off; and a fourth state, in the fourth state, the n power switch devices of the lower bridge arm assembly being all turned off. In this case, step 101 can be implemented as follows: controlling, at a preset frequency (e.g., a first frequency), the conduction state of the upper bridge arm assembly to switch between the first state and the second state; and controlling, at a preset frequency (e.g., a second frequency), the conduction state of the lower bridge arm assembly to switch between the fourth state and the third state. When the conduction state of the upper bridge arm assembly is the first state, the conduction state of the lower bridge arm assembly is the fourth state (for example, as shown in FIG. 3), and when the conduction state of the upper bridge arm assembly is the second state, the conduction state of the lower bridge arm assembly is the third state (for example, as shown in FIG. 4).

The neutral point of the n-phase winding is electrically connected to the battery pack through the second connecting wire, and the n-phase winding is further connected between the upper bridge arm assembly and the lower bridge arm assembly.

In addition, the number of power switch devices in the upper bridge arm assembly is equal to the number of power switch devices in the lower bridge arm assembly. For example, the number of power switch devices in the upper bridge arm assembly is 3, and the number of power switch devices in the lower bridge arm assembly is also 3.

In addition, in the first preset time period, when the upper bridge arm assembly is controlled, at the preset frequency, to switch between the first state and the second state, the lower bridge arm assembly is simultaneously controlled to switch between the third state and the fourth state. Furthermore, the states of the upper bridge arm assembly and the lower bridge arm assembly are switched at a preset frequency, so that a generation frequency of the alternating current can be determined and a self-heating frequency of the battery pack can be determined. Therefore, the preset frequency can be controlled, thereby controlling the self-heating frequency of the battery pack. That is, when the upper bridge arm assembly is controlled, at the preset frequency, to switch between the first state and the second state, the lower bridge arm assembly is simultaneously controlled to switch between the third state and the fourth state, so that the self-heating frequency of the battery pack can be easily controlled, thereby controlling self-heating of the battery pack.

In addition, in the first state, at least one power switch device of the upper bridge arm assembly is turned on, and the remaining power switch device is turned off. In this case, all the power switch devices of the upper bridge arm assembly may be turned on, or one or more power switch devices of the upper bridge arm assembly may be turned on, and the remaining power switch device is turned off. For example, the upper bridge arm assembly includes 3 power switch devices, and all the 3 power switch devices are turned on. In an embodiment, 1 of the 3 power switch devices can be turned on, and the remaining 2 power switch devices can be turned off. In an embodiment, 2 of the 3 power switch devices can be turned on, and the remaining 1 power switch device can be turned off.

Similarly, in the third state, at least one power switch device of the lower bridge arm assembly is turned on, and the remaining power switch device is turned off. In this case, all the power switch devices of the lower bridge arm assembly may be turned on, or one power switch device of the lower bridge arm assembly may be turned on, and the remaining power switch device is turned off. For example, the lower bridge arm assembly includes 3 power switch devices, and all the 3 power switch devices are turned on. In an embodiment, 1 of the 3 power switch devices can be turned on, and the remaining 2 power switch devices can be turned off. In an embodiment, 2 of the 3 power switch devices can be turned on, and the remaining 1 power switch device can be turned off.

In addition, in some implementations, step 101 can also be implemented as: controlling, at a preset frequency (e.g., a third frequency), the n power switch devices of the upper bridge arm assembly to switch between being simultaneously turned on and being simultaneously turned off, and controlling, at a preset frequency (e.g., a fourth frequency), the n power switch devices of the lower bridge arm assembly to switch between being simultaneously turned off and being simultaneously turned on, the conduction states of the upper bridge arm assembly and the lower bridge arm assembly being different at a same moment.

A power switch device of the upper bridge arm assembly is connected to a power switch device of the lower bridge arm assembly, that is, the power switch device of the upper bridge arm assembly one-to-one corresponds to the power switch device of the lower bridge arm assembly. When a power switch device of the upper bridge arm assembly is turned on, a power switch device of the lower bridge arm assembly corresponding to this power switch device is turned off, that is, a state of the power switch device of the upper bridge arm assembly is different from that of a corresponding power switch device of the lower bridge arm assembly. That is, when the n power switch devices of the upper bridge arm assembly are controlled, at a preset frequency, to simultaneously turn on, the n power switch devices of the lower bridge arm assembly are simultaneously controlled to simultaneously turn off, or when the n power switch devices of the upper bridge arm assembly are controlled, at a preset frequency, to simultaneously turn off, the n power switch devices of the lower bridge arm assembly are simultaneously controlled to simultaneously turn on.

In addition, in some implementations, in the first state, the n power switch devices of the upper bridge arm assembly are all turned on; and in the third state, the n power switch devices of the lower bridge arm assembly are all turned on.

In addition, in the first preset time period of the control period, when all the n power switch devices of the upper bridge arm assembly are turned on and all the n power switch devices of the lower bridge arm assembly are turned off, or when all the n power switch devices of the upper bridge arm assembly are turned off and all the n power switch devices of the lower bridge arm assembly are turned on, the motor may not output torque, which is equivalent to that the motor does not provide power to the electric vehicle. However, since the length of the control period is relatively small, when a preset time period is selected from a control period, even if the motor does not output torque in this preset time period, the driving of the electric vehicle is not affected. For example, the length of the control period is 1 millisecond, and the preset time period is the time range of 0.5 milliseconds to 0.8 milliseconds within the 1 millisecond, which is equivalent to that the electrode does not output torque for only 0.3 milliseconds, but this does not affect the normal driving of the electric vehicle.

In addition, in an embodiment of the present disclosure, the first preset time period occupies $1/n+1$ to ½ of the control period. n is an integer greater than 1.

When the first preset time period occupies $1/n+1$ to ½ of the control period, it is equivalent to that the first preset time period occupies less time in the control period, thus not affecting the driving of the electric vehicle. That is, during the driving of the electric vehicle, by controlling the conduction state of the upper bridge arm assembly and the lower bridge arm assembly to be the self-heating state in the first preset time period of the control period, the normal driving of the electric vehicle is not affected, so that the battery pack can be heated without affecting the normal driving of the electric vehicle.

In addition, in some implementations, the upper bridge arm assembly 11 includes three power switch devices, the lower bridge arm assembly 12 includes three power switch devices, and each power switch device includes a turn-on state and a turn-off state. The first state may be that all three power switch devices of the upper bridge arm assembly are in the turn-on state. The third state may be that all three power switch devices of the lower bridge arm assembly are in the turn-off state.

It should be noted that, in this embodiment of the present disclosure, types of the power switch devices may include but are not limited to insulated gate bipolar transistors (Insulated Gate Bipolar Transistor, IGBT), MOS transistors, and the like.

The following is a detailed description of the conduction state of the upper bridge arm assembly and the lower bridge arm assembly being the self-heating state in the first preset time period, so that the alternating current is generated on the second connecting wire between the motor and the battery pack with reference to the accompanying drawings:

As shown in FIG. 2, the battery pack 30 includes a first battery pack 31 and a second battery pack 32. The first battery pack 31 and the second battery pack 32 are connected in series. The neutral point (point n in the figure) of the motor 20 is connected between the first battery pack 31 and the second battery pack 32, that is, the motor 20 is connected at the midpoint of the battery pack 30. The second connecting wire between the motor and the battery pack can be referred to as a wire N. The first battery pack 31 and the second battery pack 32 may have the same capacity. In addition, as shown in FIG. 2, the motor 20 may include three-phase windings: a first winding 21, a second winding 22, and a third winding 23. One end of the first winding 21, one end of the second winding 22, and one end of the third winding 23 are connected between the three power switch devices of the upper bridge arm assembly and the three power switch devices of the lower bridge arm assembly, and the other end of the first winding 21, the other end of the second winding 22, and the other end of the third winding 23 are commonly connected to form the neutral point of the motor.

In the state shown in FIG. 3, each power switch device of the upper bridge arm assembly is in the turn-on state, and each power switch device of the lower bridge arm assembly is in the turn-off state in FIG. 3. In this case, the current in the first battery pack of the battery pack flows through the upper bridge arm assembly and flows to the point n, that is, the neutral point of the motor, and then flows into the battery pack from the wire N. A black arrow in FIG. 3 represents the flow direction of the current, the current on the wire N in FIG. 3 is I1, and a direction of I1 can be a positive direction. In the state shown in FIG. 4, each power switch device of the upper bridge arm assembly is in the turn-off state, and each power switch device of the lower bridge arm assembly is in the turn-on state in FIG. 4. In this case, the current in the second battery pack of the battery pack flows through the wire N, flows to each power switch device of the lower bridge arm assembly, and then flows into the battery pack from the lower bridge arm assembly. A black arrow in FIG. 4 represents the flow direction of the current, the current on the wire N in FIG. 4 is I2, and a direction of I2 can be a negative direction. With reference to FIG. 3 and FIG. 4, it can be seen that the power switch devices of the upper bridge arm assembly are controlled to simultaneously turn off or turn on, and the power switch devices of the lower bridge arm assembly are controlled to simultaneously turn on or turn off. In this process, the directions of the currents on the wire N, that is, I1 and I2 are opposite, which is equivalent to that the wire N has an alternating current. The wire N is connected to the battery pack; therefore, the alternating current on the wire N flows into the battery pack, and the battery pack has the alternating current, so that the battery pack can produce a staggered oscillation effect and generate heat.

When the electric vehicle drives, especially when the electric vehicle is in a low-temperature environment, the motor controller controls the power switch devices of the upper bridge arm assembly to simultaneously turn off or turn on in the first preset time periods of at least some of the control periods, and controls the power switch devices of the lower bridge arm assembly to simultaneously turn on or turn off, and the state of the upper bridge arm assembly is different from the state of the lower bridge arm assembly at a same moment, so that when the electric vehicle drives, the battery pack can self-heat through staggered oscillation. That is, the electric vehicle can drive while the battery pack self-heats.

In addition, in the first preset time periods of at least some of the control periods, the upper bridge arm assembly and the lower bridge arm assembly can be controlled once, that is, the power switch devices of the upper bridge arm assembly are controlled to simultaneously switch from being turned on to being turned off, and the power switch devices of the lower bridge arm assembly are simultaneously controlled to simultaneously switch from being turned off to being turned on. Certainly, the upper bridge arm assembly and the lower bridge arm assembly can also be controlled multiple times, that is, the power switch devices of the upper bridge arm assembly are controlled multiple times to simultaneously switch from being turned on to being turned off, and the power switch devices of the lower bridge arm assembly are simultaneously controlled multiple times to simultaneously switch from being turned off to being turned on.

For example, in the first preset time period of a control period, the power switch devices of the upper bridge arm assembly are controlled to simultaneously switch from being turned off to being turned on, and the power switch devices of the lower bridge arm assembly are simultaneously controlled to simultaneously switch from being turned on to being turned off. Then, the power switch devices of the upper bridge arm assembly are controlled to simultaneously switch from being turned on to being turned off, and the power switch devices of the lower bridge arm assembly are simultaneously controlled to simultaneously switch from being turned off to being turned on.

It should be noted that, since the motor controller controls the motor continuously, that is, there are multiple control periods, even if the upper bridge arm assembly is controlled once and the lower bridge arm assembly is controlled once to generate one alternating current in the first preset time period of one control period, multiple alternating currents are generated due to the existing of the multiple control periods. Therefore, the battery pack can still produce a staggered oscillation effect through the alternating current, so that the battery pack self-heats.

In addition, by controlling the upper bridge arm assembly and the lower bridge arm assembly in the first preset time periods of at least some of the control periods, an alternating current is generated on the second connecting wire between the motor and the battery pack, which is equivalent to adding a zero-sequence current. The battery pack is heated through the zero-sequence current, which can avoid using another heating device to heat the battery pack, that is, there is no need to use an additional heating device to heat the battery pack.

It should be noted that, the preset frequency can be set according to actual needs. A value of the preset frequency is not limited in the embodiments of the present disclosure.

In addition, after determining the generation frequency of the zero-sequence current, the amplitude of the self-heating current of the battery pack can also be determined by controlling the amplitude of the zero-sequence current. In an embodiment, since the self-heating process of the battery pack can be considered as a continuous process, but the continuous heating process is actually formed by multiple control periods, after determining the amplitude of the zero-sequence current in each control period, the amplitude of the zero-sequence current corresponding to multiple control periods can form a waveform according to the time line, so that the amplitude of the waveform can be used as the amplitude of the self-heating current of the battery pack.

In addition, in some implementations, the control method may further include: in a second preset time period of each control period for controlling the motor, controlling the upper bridge arm assembly and the lower bridge arm assembly to be in a driving state, In the driving state, a current on the second connecting wire between the motor and the battery pack is 0, where the driving state is different from the self-heating state.

In the second preset time period of each control period for controlling the motor, the upper bridge arm assembly is controlled to be in the driving state, and the lower bridge arm assembly is also controlled to be in the driving state, so that the motor generates torque and the current on the second connecting wire between the motor and the battery pack is 0. Since the control of each power switch device by the motor controller under motor driving is an existing technology, details are not described herein.

The second preset time period may be a time period other than the first preset time period in a control period. That is, the first preset time period and the second preset time period can form a complete control period.

When the motor is controlled and both the upper bridge arm assembly and the lower bridge arm assembly are in the driving state in the second preset time period of a control period, the motor generates torque, so that the motor provides power to the electric vehicle and the electric vehicle can drive normally. Moreover, when both the upper bridge arm and the lower bridge arm are in the driving state, the current on the second connecting wire between the motor and the battery pack is 0. Therefore, when the motor provides torque, the second connecting wire between the motor and the battery pack has no current. Therefore, this does not affect the operation of the motor, that is, this does not affect that the motor provides the torque to provide power to the electric vehicle.

In addition, in some implementations, the upper bridge arm assembly may include three power switch devices, the lower bridge arm assembly may include three power switch devices, and the power switch device includes a turn-on state and a turn-off state. The driving state may be that one or two of the three power switch devices of the upper bridge arm assembly is in the turn-on state, or one or two of the three power switch devices of the lower bridge arm assembly is in the turn-on state.

When one of the three power switch devices of the upper bridge arm assembly is in the turn-on state, the other two of the three power switch devices are in the turn-off state. When two of the three power switch devices of the upper bridge arm assembly are in the turn-on state, the remaining of the three power switch devices is in the turn-off state. Moreover, the state of the upper bridge arm assembly is opposite to that of the lower bridge arm assembly, that is, when a power switch device of the upper bridge arm assembly is in the turn-on state, a power switch device of the lower bridge arm assembly corresponding to this power switch device is in the turn-off state. That is, if one of the three power switch devices of the upper bridge arm assembly is in the turn-on state and the other two power switch devices are in the turn-off state, one of the three power switch devices of the lower bridge arm assembly that is connected to the power switch device of the upper bridge arm assembly in the turn-on state is in the turn-off state, and the other two power switch devices are in the turn-on state. If two of the three power switch devices of the upper bridge arm assembly are in the turn-on state and the remaining power switch device is in the turn-off state, two of the three power switch devices of the lower bridge arm assembly that are connected to the two power switch devices of the upper bridge arm assembly in the turn-on state are in the turn-off state, and the remaining power switch device is in the turn-on state.

The following is a detailed description of both the upper bridge arm assembly and the lower bridge arm assembly being in the driving state in the second preset time period, so that the current on the second connecting wire between the motor and the battery pack is 0 with reference to the accompanying drawings:

As shown in FIG. 2, the battery pack includes a first battery pack and a second battery pack. The first battery pack and the second battery pack are connected in series. The motor is connected between the first battery pack and the second battery pack, that is, the motor is connected at the midpoint of the battery pack. The second connecting wire between the motor and the battery pack can be referred to as a wire N.

FIG. 5 is a first equivalent circuit diagram of FIG. 1, and FIG. 6 is a second equivalent circuit diagram of FIG. 1. In FIG. 5, only the first battery pack is included, and in FIG. 6, only the second battery pack is included.

Figures 7, 8, 9:
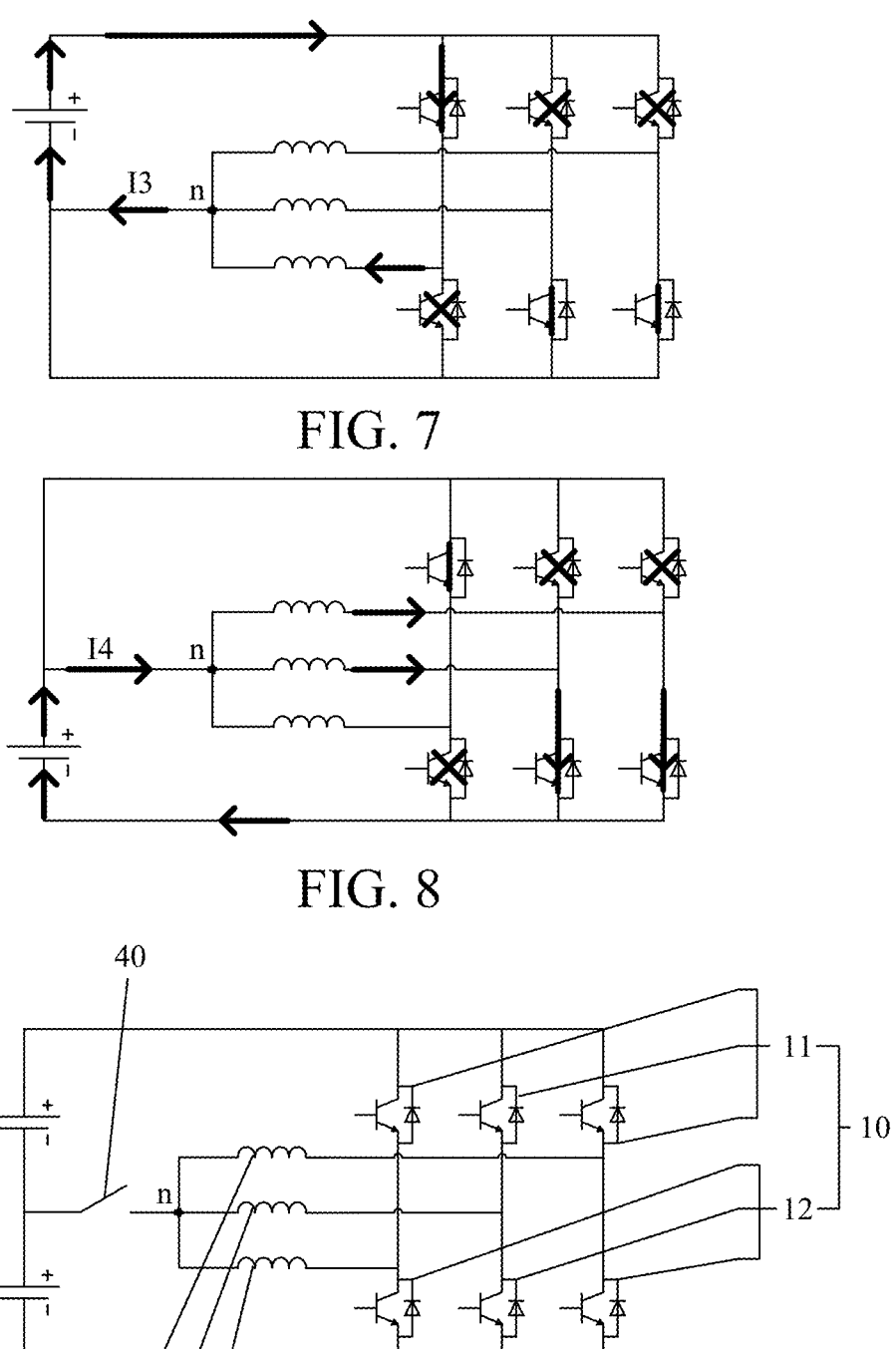
FIG. 7 is a schematic diagram of a current flow direction on a wire N in the circuit diagram in FIG. 5.
FIG. 8 is a schematic diagram of a current flow direction on a wire N in the circuit diagram in FIG. 6.
FIG. 9 is a schematic diagram of a battery self-heating control system according to an embodiment of the present disclosure.

In addition, for a circuit, a total positive current in the circuit is equal to a total negative current. Refer to FIG. 7 and FIG. 8. In FIG. 7, only the first battery pack is included, the upper bridge arm assembly is in the driving state and the lower bridge arm assembly is in the driving state, that is, one power switch device of the upper bridge arm assembly is in the turn-on state and the other two power switch devices are in the turn-off state, and one power switch device of the lower bridge arm assembly is in the turn-off state and the other two power switch devices are in the turn-on state. Besides, the current on the wire N can be 13. A black arrow indicates a flow direction of the current. The direction of 13 can be a positive direction, and the value of 13 is equal to the current value of the positive electrode of the first battery pack. In FIG. 8, only the second battery pack is included, the upper bridge arm assembly is in the driving state and the lower bridge arm assembly is in the driving state, that is, one power switch device of the upper bridge arm assembly is in the turn-on state and the other two power switch devices are in the turn-off state, and one power switch device of the lower bridge arm assembly is in the turn-off state and the other two power switch devices are in the turn-on state. Besides, the current on the wire N can be 14. A black arrow indicates a flow direction of the current. The direction of 14 can be a negative direction, and the value of 14 is equal to the current value of the positive electrode of the second battery pack. The current values of the first battery pack and the second battery pack are equal, which is equivalent to that the wire N has currents with equal values and opposite directions at the same time. The two currents cancel each other; therefore, the current on the wire N is 0.

It should be noted that, the first battery pack and the second battery pack may have the same capacity (or certainly may have different capacities). The first battery pack may include multiple cells, and the second battery pack may also include multiple cells. The number of cells in the first battery pack may be the same as the number of cells in the second battery pack, or certainly the numbers may be different. This is not limited in the embodiments of the present disclosure.

In addition, when the motor is controlled and both the upper bridge arm assembly and the lower bridge arm assembly are in the driving state in the second preset time period of a control period, if one of the three power switch devices of the upper bridge arm assembly is in the turn-on state and the other two power switch devices are in the turn-off state, one of the three power switch devices of the lower bridge arm assembly that is connected to the power switch device of the upper bridge arm assembly in the turn-on state is in the turn-off state, and the other two power switch devices are in the turn-on state. In an embodiment, if two of the three power switch devices of the upper bridge arm assembly are in the turn-on state and the remaining power switch device is in the turn-off state, two of the three power switch devices of the lower bridge arm assembly that are connected to the two power switch devices of the upper bridge arm assembly in the turn-on state are in the turn-off state, and the remaining power switch device is in the turn-on state. In this case, the motor generates torque, so that the motor provides power to the electric vehicle and the electric vehicle can drive normally. Moreover, when both the upper bridge arm and the lower bridge arm are in the driving state, the current on the second connecting wire between the motor and the battery pack is 0. Therefore, when the motor provides torque, this does not affect the operation of the motor, that is, this does not affect that the motor provides the torque to provide power to the electric vehicle.

In this embodiment of the present disclosure, in first preset time periods of at least some of control periods for driving and controlling the motor, a conduction state of the upper bridge arm assembly and the lower bridge arm assembly is controlled to be a self-heating state. In the self-heating state, an alternating current is provided on a second connecting wire between the motor and the battery pack, to alternately charge and discharge the first battery pack and/or the second battery pack, to heat the battery pack. That is, in the first preset time period, the conduction state of the upper bridge arm assembly and the lower bridge arm assembly is caused to be the self-heating state, and the alternating current is provided on the second connecting wire between the motor and the battery pack, so that the alternating current can flow into the battery pack. The battery pack can produce a staggered oscillation effect due to the alternating current, so that the battery pack can generate heat, that is, the battery pack can self-heat, thereby avoiding providing an additional heating device to heat the battery pack, thereby reducing the costs of the electric vehicle.

FIG. 9 is a schematic diagram of a control system according to an embodiment of the present disclosure. The system includes a battery pack, a motor, and a motor controller.

The motor controller is electrically connected to each of the motor and the battery pack, and the motor is electrically connected to the battery pack. The motor controller includes a bridge arm inverter structure, and the bridge arm inverter structure includes an upper bridge arm assembly and a lower bridge arm assembly. The upper bridge arm assembly and the lower bridge arm assembly are connected in series, the upper bridge arm assembly is connected to a positive electrode of the battery pack, and the lower bridge arm assembly is connected to a negative electrode of the battery pack.

The battery pack includes a first battery pack and a second battery pack connected in series, a first connecting wire is led out between the first battery pack and the second battery pack, one end of the motor is connected between the upper bridge arm assembly and the lower bridge arm assembly, and the other end of the motor is electrically connected to the battery pack through the first connecting wire.

The motor controller is configured to: in first preset time periods of at least some of control periods for driving and controlling the motor, control a conduction state of the upper bridge arm assembly and the lower bridge arm assembly to be a self-heating state. In the self-heating state, an alternating current is provided on a second connecting wire between the motor and the battery pack, to alternately charge and discharge the first battery pack and/or the second battery pack, to heat the battery pack.

In an embodiment, the motor includes an n-phase winding, and a neutral point of the n-phase winding is electrically connected to the battery pack through the second connecting wire.

The upper bridge arm assembly includes n power switch devices, the lower bridge arm assembly includes n power switch devices, and n is an integer greater than 1.

The self-heating state includes:

a first state, in the first state, at least one power switch device of the upper bridge arm assembly being turned on, and the remaining power switch device being turned off;

a second state, in the second state, the n power switch devices of the upper bridge arm assembly being all turned off;

a third state, in the third state, at least one power switch device of the lower bridge arm assembly being turned on, and the remaining power switch device being turned off; and a fourth state, in the fourth state, the n power switch devices of the lower bridge arm assembly being all turned off; and the motor controller controls, at a preset frequency, the conduction state of the upper bridge arm assembly to switch between the first state and the second state; and the motor controller controls, at a preset frequency, the conduction state of the lower bridge arm assembly to switch between the fourth state and the third state.

In an embodiment, in the first state, the n power switch devices of the upper bridge arm assembly are all turned on; and in the third state, the n power switch devices of the lower bridge arm assembly are all turned on.

In an embodiment, the motor controller controls, at a preset frequency, the n power switch devices of the upper bridge arm assembly to switch between being simultaneously turned on and being simultaneously turned off, and controls, at a preset frequency, the n power switch devices of the lower bridge arm assembly to switch between being simultaneously turned off and being simultaneously turned on, the conduction states of the upper bridge arm assembly and the lower bridge arm assembly being different at a same moment.

In an embodiment, the motor controller is further configured to: in a second preset time period of each control period for controlling the motor, control the upper bridge arm assembly and the lower bridge arm assembly to be in a driving state. In the driving state, a current on the second connecting wire between the motor and the battery pack being 0;

where the driving state is different from the self-heating state.

In an embodiment, the first preset time period occupies 1/n+1 to ½ of the control period.

In an embodiment, the system further includes:

a switch apparatus 40 provided/disposed on the second connecting wire, configured to turn on in the first preset time period and turn off in the second preset time period.

After the switch apparatus 40 is provided, the current on the second connecting wire can be controlled through the switch apparatus 40. When the switch apparatus 40 is turned on, the current can flow through the second connecting wire. When the switch apparatus 40 is turned off, the current cannot flow through the second connecting wire. That is, by providing the switch apparatus 40, the current on the second connecting wire can be controlled by the switch apparatus 40.

It should be noted that, the switch apparatus 40 includes but is not limited to insulated gate bipolar transistors (Insulated Gate Bipolar Transistor, IGBT), MOS transistors, and the like. Types of the switch apparatus 40 are not limited in the embodiments of the present disclosure.

In this embodiment of the present disclosure, in first preset time periods of at least some of control periods for driving and controlling the motor, a conduction state of the upper bridge arm assembly and the lower bridge arm assembly is controlled to be a self-heating state. In the self-heating state, an alternating current being provided on a second connecting wire between the motor and the battery pack, to alternately charge and discharge the first battery pack and/or the second battery pack, to heat the battery pack. That is, in the first preset time period, the conduction state of the upper bridge arm assembly and the lower bridge arm assembly is caused to be the self-heating state, and the alternating current is provided on the second connecting wire between the motor and the battery pack, so that the alternating current can flow into the battery pack. The battery pack can produce a staggered oscillation effect due to the alternating current, so that the battery pack can generate heat, that is, the battery pack can self-heat, thereby avoiding providing an additional heating device to heat the battery pack, thereby reducing the costs of the electric vehicle.

An embodiment of the present disclosure provides an electric vehicle, including the battery self-heating control system in any one of the above embodiments.

In this embodiment of the present disclosure, in first preset time periods of at least some of control periods for driving and controlling the motor, a conduction state of the upper bridge arm assembly and the lower bridge arm assembly is controlled to be a self-heating state. In the self-heating state, an alternating current being provided on a second connecting wire between the motor and the battery pack, to alternately charge and discharge the first battery pack and/or the second battery pack, to heat the battery pack. That is, in the first preset time period, the conduction state of the upper bridge arm assembly and the lower bridge arm assembly is caused to be the self-heating state, and the alternating current is provided on the second connecting wire between the motor and the battery pack, so that the alternating current can flow into the battery pack. The battery pack can produce a staggered oscillation effect due to the alternating current, so that the battery pack can generate heat, that is, the battery pack can self-heat, thereby avoiding providing an additional heating device to heat the battery pack, thereby reducing the costs of the electric vehicle.

In the description of this specification, the description of the reference terms "an embodiment", "some embodiments", "an example", "a specific example", "some examples" and the like means that features, structures, materials or characteristics described in combination with the embodiment(s) or example(s) are included in at least one embodiment or example of the present disclosure. In this specification, schematic descriptions of the foregoing terms are not necessarily directed at the same embodiment or example. Besides, the features, the structures, the materials or the characteristics that are described may be combined in proper manners in any one or more embodiments or examples. In addition, a person skilled in the art may integrate or combine different embodiments or examples described in the specification and features of the different embodiments or examples as long as they are not contradictory to each other.

In addition, terms "first" and "second" are used merely for the purpose of description, and shall not be construed as indicating or implying relative importance or implying a quantity of indicated technical features. Therefore, a feature restricted by "first" or "second" may explicitly indicate or implicitly include at least one of such features. In the descriptions of the present disclosure, unless explicitly specified, "multiple" means at least two, for example, two or three.

A description of any process or method in the flowcharts or described herein in another manner can be construed as representing one or more modules, fragments, or parts that include code of executable instructions used to implement a logical function or steps of a process. In addition, the scope of the implementations of the present disclosure includes another implementation, where functions can be performed not in an order shown or discussed, including performing the functions basically at the same time or in reverse order according to the functions involved. This should be understood by a person skilled in the technical field to which the embodiments of the present disclosure belong.

The logic and/or steps shown in the flowcharts or described in any other manner herein, for example, a sequenced list that may be considered as executable instructions used for implementing logical functions, may be implemented in any computer-readable medium to be used by an instruction execution system, apparatus, or device (for example, a computer-based system, a system including a processor, or another system that can obtain an instruction from the instruction execution system, apparatus, or device and execute the instruction) or to be used by combining such instruction execution systems, apparatuses, or devices. In the context of this specification, a "computer-readable medium" may be any apparatus that can include, store, communicate, propagate, or transmit the program for use by the instruction execution system, apparatus, or device or in combination with the instruction execution system, apparatus, or device. More examples (non-exhaustive list) of the computer-readable medium include the following: an electrical connection (electronic apparatus) having one or more wires, a portable computer diskette (magnetic apparatus), a random access memory (RAM), a read-only memory (ROM), an erasable programmable read-only memory (EPROM or flash memory), an optical fiber apparatus, and a portable compact disk read-only memory (CDROM). In addition, the computer-readable medium can even be paper or other suitable media on which the program can be printed, because the program can be obtained electronically by, for example, optically scanning paper or other media, then editing, interpreting, or processing in other suitable ways if necessary, and then storing it in a computer memory.

It should be understood that, parts of the present disclosure can be implemented by using hardware, software, firmware, or a combination thereof. In the foregoing implementations, a plurality of steps or methods may be implemented by using software or firmware that are stored in a memory and are executed by a proper instruction execution system. For example, if hardware is used for implementation, same as in another implementation, implementation may be performed by any one of the following technologies well known in the art or a combination thereof: a discrete logic circuit including a logic gate circuit for implementing a logic function of a data signal, a dedicated integrated circuit including a proper combined logic gate circuit, a programmable gate array (PGA), a field programmable gate array (FPGA), and the like.

A person of ordinary skill in the art may understand that all or some of the steps of the methods in the foregoing embodiments may be implemented by a program instructing relevant hardware. The program may be stored in a computer-readable storage medium. When the program is executed, one or a combination of the steps of the method embodiments are performed.

Functional units according to the embodiments of the present disclosure may be integrated in one processing module or exist as separate physical units, or two or more units are integrated into one module. The integrated module may be implemented in the form of hardware, or may be implemented in a form of a software functional module. If implemented in the form of software functional modules and sold or used as an independent product, the integrated module may also be stored in a computer-readable storage medium.

The storage medium mentioned above may be a read-only memory, a magnetic disk, an optical disc, or the like. Although the embodiments of the present disclosure have been shown and described above, it can be understood that, the foregoing embodiments are examples and should not be understood as limitation to the present disclosure. A person of ordinary skill in the art can make changes, modifications, replacements, or variations to the foregoing embodiments within the scope of the present disclosure.

What is claimed is:

1. A method for self-heating a battery pack, applied to a motor controller in an electric vehicle, the motor controller electrically connected to a motor and the battery pack, and the motor electrically connected to the battery pack;

the motor controller comprising a bridge arm inverter structure, the bridge arm inverter structure comprising an upper bridge arm assembly and a lower bridge arm assembly connected to each other, the upper bridge arm assembly connected to a positive electrode of the battery pack, and the lower bridge arm assembly connected to a negative electrode of the battery pack;

the battery pack comprising a first battery pack and a second battery pack connected to each other, a first connecting wire led out between the first battery pack and the second battery pack, a first end of the motor connected between the upper bridge arm assembly and the lower bridge arm assembly, and a second end of the motor electrically connected to the battery pack through the first connecting wire; and the method comprising:

in a first period of each of control periods, configuring a conduction state of the upper bridge arm assembly and a conduction state of the lower bridge arm assembly to be a self- heating state, wherein: the self-heating state comprises a first state, a second state, a third state, and a fourth state; at a first frequency, the conduction state of the upper bridge arm assembly is switched between the first state and the second state; and at a second frequency, the conduction state of the lower bridge arm assembly is switched between the fourth state and the third state; and in the self-heating state, alternately charging and discharging the first battery pack or the second battery pack to heat the battery pack by a current on a second connecting wire between the motor and the battery pack.

2. The method according to claim 1, wherein the motor comprises an n-phase winding, a neutral point of the n-phase winding is electrically connected to the battery pack through the second connecting wire, and n is an integer greater than 1;

the upper bridge arm assembly comprises n power switch devices, and the lower bridge arm assembly comprises n power switch devices;

in the first state, at least one power switch device of the n power switch devices of the upper bridge arm assembly is turned on, and power switch devices other than the at least one power switch device of the upper bridge arm assembly are turned off;

in the second state, the n power switch devices of the upper bridge arm assembly are turned off;

in the third state, at least one power switch device of the n power switch devices of the lower bridge arm assembly is turned on, and power switch devices other than the at least one power switch device of the lower bridge arm assembly are turned off; and in the fourth state, the n power switch devices of the lower bridge arm assembly are turned off.

3. The method according to claim 2, wherein in the first state, the n power switch devices of the upper bridge arm assembly are turned on; and in the third state, the n power switch devices of the lower bridge arm assembly are turned on.

4. The method according to claim 3, wherein the configuring a conduction state of the upper bridge arm assembly and a conduction state of the lower bridge arm assembly to be a self-heating state comprises:

at a third frequency, simultaneously turning the n power switch devices of the upper bridge arm assembly on or off, and at a fourth frequency, simultaneously turning the n power switch devices of the lower bridge arm assembly off or on, wherein the conduction state of the upper bridge arm assembly and the conduction state of the lower bridge arm assembly are different at a same moment.

5. The method according to claim 1, further comprising:

in a second period of each of the control periods, configuring the upper bridge arm assembly and the lower bridge arm assembly to be in a driving state, wherein in the driving state, the current on the second connecting wire between the motor and the battery pack is 0; and the driving state and the self-heating state are different states.

6. The method according to claim 2, wherein the first period occupies $$\frac{1}{n} + 1 \text{ to } \frac{1}{2}$$

of each of the control periods.

7. A system for self-heating a battery pack, comprising the battery pack, a motor, and a motor controller;

the motor controller electrically connected to the motor and the battery pack, and the motor electrically connected to the battery pack;

the motor controller comprising a bridge arm inverter structure, the bridge arm inverter structure comprising an upper bridge arm assembly and a lower bridge arm assembly connected to each other, the upper bridge arm assembly connected to a positive electrode of the battery pack, and the lower bridge arm assembly connected to a negative electrode of the battery pack;

the battery pack comprising a first battery pack and a second battery pack connected to each other, a first connecting wire led out between the first battery pack and the second battery pack, a first end of the motor connected between the upper bridge arm assembly and the lower bridge arm assembly, and a second end of the motor electrically connected to the battery pack through the first connecting wire; and the motor controller configured to:

in a first period of each of control periods, configure a conduction state of the upper bridge arm assembly and a conduction state of the lower bridge arm assembly to be a self- heating state, wherein: the self-heating state comprises a first state, a second state, a third state, and a fourth state; at a first frequency, the motor controller is configured to switch the conduction state of the upper bridge arm assembly between the first state and the second state; and at a second frequency, the motor controller is configured to switch the conduction state of the lower bridge arm assembly between the fourth state and the third state; and in the self-heating state, alternately charge and discharge the first battery pack or the second battery pack to heat the battery pack by a current on a second connecting wire between the motor and the battery pack.

8. The system according to claim 7, wherein the motor comprises an n-phase winding, a neutral point of the n-phase winding is electrically connected to the battery pack through the second connecting wire, and n is an integer greater than 1;

the upper bridge arm assembly comprises n power switch devices, and the lower bridge arm assembly comprises n power switch devices;

in the first state, at least one power switch device of the n power switch devices of the upper bridge arm assembly is turned on, and power switch devices other than the at least one power switch device of the upper bridge arm assembly are turned off;

in the second state, the n power switch devices of the upper bridge arm assembly are turned off;

in the third state, at least one power switch device of the n power switch devices of the lower bridge arm assembly is turned on, and power switch devices other than the at least one power switch device of the lower bridge arm assembly are turned off; and in the fourth state, the n power switch devices of the lower bridge arm assembly are turned off.

9. The system according to claim 8, wherein in the first state, the n power switch devices of the upper bridge arm assembly are turned on; and in the third state, the n power switch devices of the lower bridge arm assembly are turned on.

10. The system according to claim 9, wherein at a third frequency, the motor controller simultaneously turns the n power switch devices of the upper bridge arm assembly on or off, at a fourth frequency, the motor controller simultaneously turns the n power switch devices of the lower bridge arm assembly off or on, and the conduction state of the upper bridge arm assembly and the conduction state of the lower bridge arm assembly are different at a same moment.

11. The system according to claim 7, wherein in a second period of each of the control periods, the motor controller configures the upper bridge arm assembly and the lower bridge arm assembly to be in a driving state, wherein in the driving state, the current on the second connecting wire between the motor and the battery pack is 0; and the driving state and the self-heating state are different states.

12. The system according to claim 7, wherein the first period occupies $$\frac{1}{n} + 1 \text{ to } \frac{1}{2}$$

of each of the control periods.

13. The system according to claim 11, further comprising:
a switch apparatus disposed on the second connecting wire, and configured to turn on in the first period and turn off in the second period.

14. An electric vehicle, comprising a system for self-heating a battery pack, the system comprising the battery pack, a motor, and a motor controller;
the motor controller electrically connected to the motor and the battery pack, and the motor electrically connected to the battery pack;
the motor controller comprising a bridge arm inverter structure, the bridge arm inverter structure comprising an upper bridge arm assembly and a lower bridge arm assembly connected to each other, the upper bridge arm assembly connected to a positive electrode of the battery pack, and the lower bridge arm assembly connected to a negative electrode of the battery pack;
the battery pack comprising a first battery pack and a second battery pack connected to each other, a first connecting wire led out between the first battery pack and the second battery pack, a first end of the motor connected between the upper bridge arm assembly and the lower bridge arm assembly, and a second end of the motor electrically connected to the battery pack through the first connecting wire; and
the motor controller configured to:
in a first period of each of control periods, configure a conduction state of the upper bridge arm assembly and a conduction state of the lower bridge arm assembly to be a self-heating state, wherein: the self-heating state comprises a first state, a second state, a third state, and a fourth state; at a first frequency, the motor controller is configured to switch the conduction state of the upper bridge arm assembly between the first state and the second state; and at a second frequency, the motor controller is configured to switch the conduction state of the lower bridge arm assembly between the fourth state and the third state; and
in the self-heating state, alternately charge and discharge the first battery pack and/or or the second battery pack to heat the battery pack by a current on a second connecting wire between the motor and the battery pack.

15. The electric vehicle according to claim 14, wherein the motor comprises an n-phase winding, a neutral point of the n-phase winding is electrically connected to the battery pack through the second connecting wire, and n is an integer greater than 1;
the upper bridge arm assembly comprises n power switch devices, and the lower bridge arm assembly comprises n power switch devices;

in the first state, at least one power switch device of the n power switch devices of the upper bridge arm assembly is turned on, and power switch devices other than the at least one power switch device of the upper bridge arm assembly are turned off;
in the second state, the n power switch devices of the upper bridge arm assembly are turned off;
in the third state, at least one power switch device of the n power switch devices of the lower bridge arm assembly is turned on, and power switch devices other than the at least one power switch device of the lower bridge arm assembly are turned off; and
in the fourth state, the n power switch devices of the lower bridge arm assembly are turned off.

16. The electric vehicle according to claim 15, wherein in the first state, the n power switch devices of the upper bridge arm assembly are turned on; and in the third state, the n power switch devices of the lower bridge arm assembly are turned on.

17. The electric vehicle according to claim 16, wherein at a third frequency, the motor controller simultaneously turns the n power switch devices of the upper bridge arm assembly on or off, at a fourth frequency, the motor controller simultaneously turns the n power switch devices of the lower bridge arm assembly off or on, and the conduction state of the upper bridge arm assembly and the conduction state of the lower bridge arm assembly are different at a same moment.

18. The electric vehicle according to claim 14, wherein in a second period of each of the control periods, the motor controller configures the upper bridge arm assembly and the lower bridge arm assembly to be in a driving state, wherein in the driving state, the current on the second connecting wire between the motor and the battery pack is 0; and
the driving state and the self-heating state are different states.

19. The electric vehicle according to claim 14, wherein the first period $$\frac{1}{n} + 1 \text{ to } \frac{1}{2}$$

of each of the control periods.

20. The electric vehicle according to claim 18, further comprising:
a switch apparatus disposed on the second connecting wire, and configured to turn on in the first period and turn off in the second period.

* * * * *